United States Patent
Burke, Jr. et al.

(10) Patent No.: US 10,015,357 B2
(45) Date of Patent: *Jul. 3, 2018

(54) DATA STORAGE FACILITY SOLUTION MANAGEMENT SYSTEM WITH IMPROVED SEARCH ACCURACY

(71) Applicant: Conduent Business Services, LLC, Dallas, TX (US)

(72) Inventors: Robert William Burke, Jr., McKinney, TX (US); David W. Covert, Ontario, NY (US)

(73) Assignee: Conduent Business Services, LLC, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/366,454

(22) Filed: Dec. 1, 2016

(65) Prior Publication Data

US 2017/0280009 A1 Sep. 28, 2017

Related U.S. Application Data

(60) Provisional application No. 62/314,135, filed on Mar. 28, 2016.

(51) Int. Cl.
*H04N 1/32* (2006.01)
*G06F 17/30* (2006.01)
*H04N 1/00* (2006.01)

(52) U.S. Cl.
CPC ... *H04N 1/32678* (2013.01); *G06F 17/30477* (2013.01); *G06F 17/30554* (2013.01); *G06F 17/30864* (2013.01); *H04N 1/00344* (2013.01); *H04N 1/00973* (2013.01); *H04N 2201/0094* (2013.01); *H04N 2201/3202* (2013.01); *H04N 2201/3274* (2013.01); *H04N 2201/3284* (2013.01)

(58) Field of Classification Search
CPC .............................. G06F 3/1284; G06F 3/1234
See application file for complete search history.

(56) References Cited

U.S. PATENT DOCUMENTS

| | | |
|---|---|---|
| 8,787,552 B1 | 7/2014 | Zhao et al. |
| 9,305,104 B2 | 4/2016 | Wu et al. |
| 2013/0067594 A1* | 3/2013 | Kantor ................ G06F 21/6218 726/28 |
| 2013/0114100 A1* | 5/2013 | Torii ................... G06F 11/0733 358/1.14 |

* cited by examiner

*Primary Examiner* — Ibrahim Siddo
(74) *Attorney, Agent, or Firm* — Fox Rothschild LLP

(57) ABSTRACT

A distributed computing system for managing solutions for print device support requests includes a print device having a user interface, a solution data store, and a solution processing system in communication with the print device. The system receives a support request from the print device that includes print device data pertaining to an issue with the print device. The system uses the print device data to generate a search query, and queries the solution data store to identify a list of possible solutions for the support request. For each selection, the system receives, from the print device, an indication of an exit status for the support request. The system correlates the possible solution associated with the selection with the print device data, generates factors based on the correlation, and uses the generated factors to update fields of a solution index in the data store for the possible solution.

27 Claims, 18 Drawing Sheets

| PROBLEM DESCRIPTION: USER DESCRIBES YELLOW STREAKS APPEARING ON SCANNED IMAGES | | | | |
|---|---|---|---|---|
| USER TERMS | AGENT TERMS | FAULT CODE | SOLUTION | EXIT STATUS |
| N/A | YELLOW<br>STREAKS<br>IMAGES<br>SCAN | 10-101 | ContentABC | SOLVED |

FIG. 4A

PROBLEM DESCRIPTION: USER DESCRIBES STREAKS APPEARING ON SCANS

| USER TERMS | AGENT TERMS | FAULT CODE | SOLUTION | EXIT STATUS |
|---|---|---|---|---|
| N/A | STREAKS | 101-02 | ContentABC | SOLVED |
| | SCAN | | | |

FIG. 5A

| PROBLEM DESCRIPTION: USER DESCRIBES STREAKS WHILE SCANNING | | | | |
|---|---|---|---|---|
| USER TERMS | AGENT TERMS | FAULT CODE | SOLUTION | EXIT STATUS |
| N/A | STREAKS | N/A | ContentABC | NOT SOLVED |

FIG. 6A

| USER TERMS | AGENT TERMS | FAULT CODE | RESOLUTION | EXIT STATUS |
|---|---|---|---|---|
| JAM | JAM | 10-104 | Content789 | SOLVED |
| CRINKLED | AREA 3 | 1-12 | Content789 | SOLVED |
| WRINKLED PAPER | ACCORDION JAM | | Content789 | SOLVED |

KEY INPUT TERM/FAULT CORRELATION WITH SOLUTIONS

| CUSTOMER TERMS | FAULT CODES | AGENT SEARCH | |
|---|---|---|---|
| ACCORDIAN JAM STUCK IN MACHINE OUTPUT | 08-121, 10-151, 10-102, 10-104 | ACCORDIAN JAM | CONTENT ID: 1193524 → FAULT CODE 10-10X - 10-13X CLEAR THE PAPER JAM IN AREA 3 MESSAGE |
| CRINKLED PAPER AT EXIT | 10-102, 10-103, 10-104 | FUSER JAM | |
| FUSER JAM, ACCORDIAN | 07-111, 10-102, 09-115, 10-151 | EXIT JAM | |
| PAPER STUCK IN FUSER, FAN | 10-100, 12-111, 10-151 | 10-1 FUSER ACCORDIAN | |

FIG. 9

DATA STORAGE FACILITY SOLUTION MANAGEMENT SYSTEM WITH IMPROVED SEARCH ACCURACY

CROSS-REFERENCE TO RELATED APPLICATIONS

This application claims priority to U.S. Patent Application 62/314,135 filed on Mar. 28, 2016.

BACKGROUND

Current management solutions that are available for searching data storage facilities that store volumes of electronic content use search algorithms that leverage query term frequency in content and inverse document frequency. In the current systems, search results can be impacted by user content ratings associated with the results. Users commonly rate search results manually through an optional method of simple indicators.

However, when systems focus on human-provided ratings, the results can have several disadvantages. First, a human often provides a content rating with little or no context. For example, a user content rating typically does not reference what search terms resulted in the content or how a user content rating is weighted in comparison to other ratings. Second, user content ratings are completely subjective and may reflect bias. For instance, a user who has authored content or a solution being rated may rate such solution highly regardless of whether the solution is accurate or not.

The methods and systems described below involve data storage facility search technologies that reduce the inaccuracies that can result from human ratings, and which instead focus on machine learning methodologies to help improve future search results.

SUMMARY

This disclosure is not limited to the particular systems, methodologies or protocols described, as these may vary. The terminology used in this description is for the purpose of describing the particular versions or embodiments, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In an embodiment, a distributed computing system for managing solutions for print device support requests includes a print device having a user interface, a solution data store, and a solution processing system in communication with the print device. The solution data store includes one or more non-transitory computer-readable media sectors that store content representing a plurality of solutions to a plurality of print device issues. The solution processing system includes a processor and programming instructions. The system receives a support request from the print device. The support request includes print device data pertaining to an issue with the print device. The system uses the print device data to generate a search query, and queries the solution data store using the search query to identify a list of possible solutions for the support request. Each possible solution is associated with a plurality of factors, and each factor has a weight value. The system returns to the print device the list of possible solutions for display to a user of the print device via the user interface, and receive a selection of one or more of the possible solutions. For each selection, the system receives, from the print device, an indication of an exit status for the support request. The exit status represents a resolution to the support request. The system generates a session record for the support request that includes the print device data, the possible solution associated with the selection and the exit status. The system correlates the possible solution associated with the selection with the print device data, generates one or more factors based on the correlation, and uses the one or more generated factors to update one or more fields of a solution index in the data store for the possible solution.

Optionally, the system may query the solution data store for a possible solution having a highest weight value associated with the fault code.

Optionally, the system may correlate the print device data of the session record with data of each of a plurality of other session records, where each other session record is associated with the possible solution associated with the selection and reflects a session having the exit status.

Optionally, for each of the one or more factors, the system may determine whether the factor is already present in the solution index, and, in response to determining that the factor is not already present in the index, add a field for the factor to the index and assign the factor a weight value.

Optionally, the system may determine whether the factor is already present in the index. In response to determining that the factor is already present in the solution index, the system may determine whether the exit status indicates that the support request has been resolved. In response to determining that the exit status indicates that the support request has been resolved, the system may increment a weight value associated with the factor by a certain value.

Optionally, the system may determine whether the factor is already present in the solution index. In response to determining that the factor is already present in the solution index, the system may determine whether the exit status indicates that the support request has been resolved, and in response to determining that the exit status indicates that the support request has not been resolved, decrement a weight value associated with the factor by a certain value.

Optionally, the system may receive second input data pertaining to a second support request, and receive one or more search terms pertaining to the second support request. At least a portion of the search terms and/or the second input data may include one or more of the factors. The system may generate a second query based on the second input data and the search terms, query the solution data store using the second query, and identify a list of possible solutions for the second support request in a sequence. The sequence may include one or more of the possible solutions to the second support request. A position of each of the possible solutions to the second support request in the sequence may be based on the weight value for each factor.

In an embodiment, a distributed computing system for managing solutions for print device support requests includes a print device, a solution data store, and a solution processing system in communication with the print device. The solution data store includes one or more non-transitory computer-readable media sectors that store content representing a plurality of solutions to a plurality of print device issues. The solution processing system includes a processor and programming instructions. The system receives a support request from the print device that includes print device data pertaining to an issue with the print device. The system uses the print device data to generate a search query and queries the solution data store using the search query to identify a possible solution for the support request. The possible solution is associated with a plurality of factors. Each factor has a weight value, and the possible solution includes one or more machine-readable instructions for implementing the solution. The system returns to the print device the possible solution for automatic implementation. The system receives a selection of one or more of the possible solutions. For each selection, the system receives, from the print device, an indication of an exit status for the support request. The exit status may represent a resolution to the support request. The system generates a session record for the support request including the print device data, the possible solution associated with the selection and the exit status. The system correlates the possible solution associated with the selection with the print device data, generates one or more factors based on the correlation, and uses the one or more generated factors to update one or more fields of a solution index in the data store for the possible solution.

Optionally, the print device is configured to receive the possible solution from the solution processing system, extract the machine-readable instructions from the possible solution, and automatically implement the machine-readable instructions.

Optionally, the system queries the solution data store for a possible solution having a highest weight value associated with the fault code.

The system may correlate the print device data of the session record with data of each of a plurality of other session records, where each other session record is associated with the possible solution associated with the selection and reflects a session having the exit status.

Optionally, for each of the one or more factors, the system may determine whether the factor is already present in the solution index, and in response to determining that the factor is not already present in the index, add a field for the factor to the index and assign the factor a weight value.

The system may determine whether the factor is already present in the index. In response to determining that the factor is already present in the solution index, the system may determine whether the exit status indicates that the support request has been resolved, and in response to determining that the exit status indicates that the support request has been resolved, increment a weight value associated with the factor by a certain value.

Optionally, the system may determine whether the factor is already present in the solution index. In response to determining that the factor is already present in the solution index, the system may determine whether the exit status indicates that the support request has been resolved, and in response to determining that the exit status indicates that the support request has not been resolved, decrement a weight value associated with the factor by a certain value.

Optionally, the system may receive second input data pertaining to a second support request, and receive one or more search terms pertaining to the second support request. At least a portion of the search terms and/or the second input data may include one or more of the factors. The system may generate a second query based on the second input data and the search terms, query the solution data store using the second query, and identify a list of possible solutions for the second support request in a sequence. The sequence may include one or more of the possible solutions to the second support request. A position of each of the possible solutions to the second support request in the sequence may be based on the weight value for each factor.

BRIEF DESCRIPTION OF THE DRAWINGS

FIG. 4A illustrates an example session record according to an embodiment.

FIG. 5A illustrates an example session record according to an embodiment.

FIG. 6A illustrates an example session record according to an embodiment.

FIG. 9 illustrates example input data and search terms according to an embodiment.

DETAILED DESCRIPTION

Figure 1:
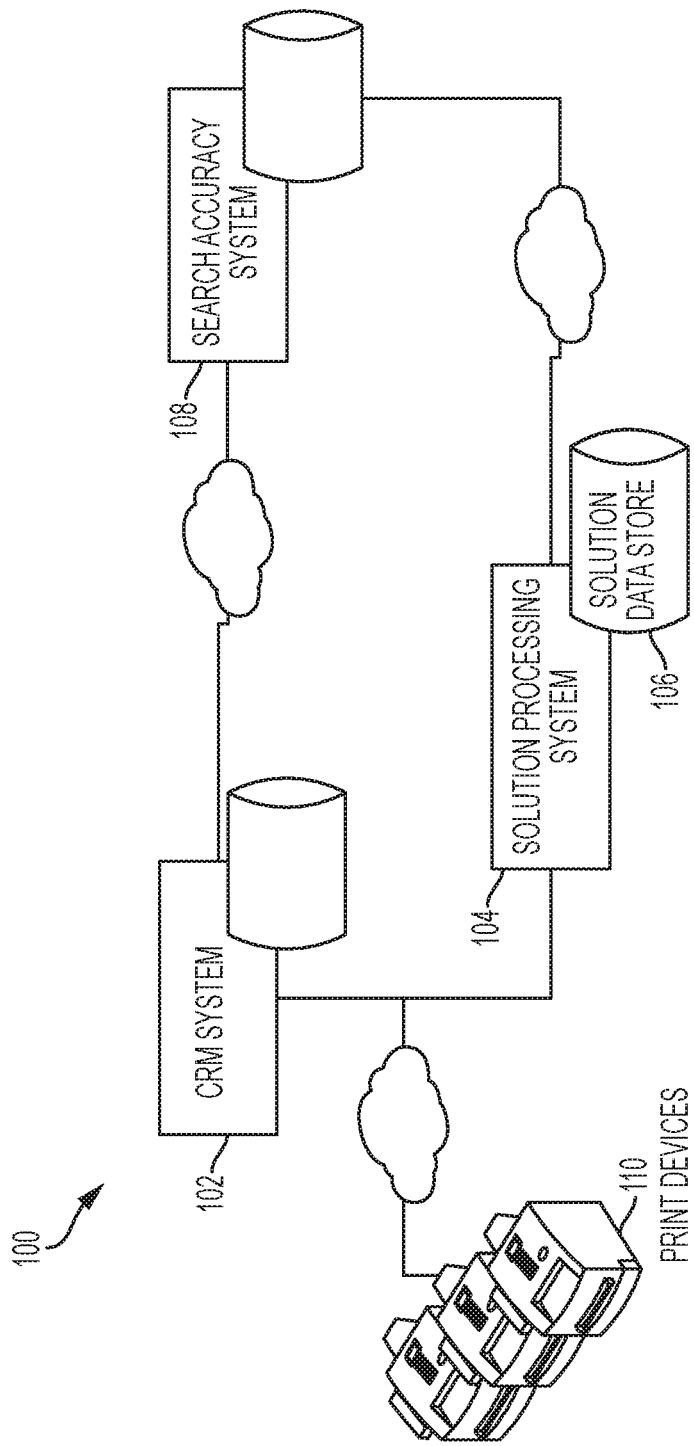
FIG. 1 shows an example system for improving search accuracy according to an embodiment.

The following terms shall have, for purposes of this application, the respective meanings set forth below:

A "customer relationship management (CRM) system" refers to an electronic system that stores, manages, tracks and/or analyzes customer information, customer interactions and/or the like.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

An "exit status" refers to a representation of a resolution for a support request.

A "print device" refers to a device capable of performing one or more functions, operations and/or services on a print job. For example, a print device may provide print-related services for one or more print jobs. A print device may include a printer, scanner, multi-function device or other similar equipment.

A "print job" refers to a logical unit of work that is to be completed. For example, a print job may be a request to print, collate, cut, staple and/or bind a document or set of documents.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

A "session" refers to period devoted to addressing a support request. A session may be a period of time that a user attempts to resolve a support request himself or herself. A session may be a period of time that an agent spends helping a user to resolve a support request.

A "session record" refers to data or information pertaining to a session or collected during a session. A session record may be an electronic data record or file.

A "solution" refers to content that includes instructions for addressing, solving or mitigating a support request. The instructions may be human-readable instructions that a user or agent can use to try and resolve a support request. The instructions may be machine-readable instructions that an electronic device, such as a print device, may use to try and resolve a support request. In certain embodiments, the instructions may be a combination of human-readable and machine-readable instructions.

A "solution data store" refers to a data storage facility that includes non-transitory computer-readable media sectors that store solutions and/or other information.

A "solution index" refers to a search engine index that provides results for search queries. More specifically, a solution index provides one or more solutions as results to one or more search queries.

A "solution processing system" refers to an electronic data processing and search platform that provides text indexing and search functionalities utilizing one or more solution data stores. A solution processing system stores, retrieves and analyzes information from solution data stores, including solutions to various support requests pertaining to print devices. An example solution processing system may be a knowledge management system according to an embodiment.

A "support request" refers to a request for support or service with respect to a product or service. A support request may be an electronic request such as an email, a chat session, a screen share session and/or the like. A support request may be a direct interaction such as a telephone call, an in-person discussion and/or the like. A support request may be a request from a print device that includes print device data.

FIG. 1 shows an example distributed computing system for managing a data set of knowledge for print device support requests according to an embodiment. The system may be used to address or resolve user or customer questions, concerns or to provide customer support. For instance, the system illustrated by FIG. 1 may be used to provide technical or other customer support to users of print-related devices or services. Additional and/or other types of support may be provided pursuant to this disclosure.

A system such as that illustrated in FIG. 1 may be used directly by customers or other users who are seeking information pertaining to a support request, such as, for example, an answer to a question or more information about a particular topic. For instance, a user of a print device may be experiencing an issue with the print device, such as paper jam error. The user may access a system to try and identify a solution to the paper jam error. A user can access the system via a website, a software application, a product page and/or the like.

Alternatively, a system may be used by a customer support representative who is assisting a user. For instance, a user of a print device may be experiencing an issue with the print device, such as paper jam error. The user may request assistance from a customer support representative, such as one affiliated with the manufacturer or service provider of the print device. A user may request assistance from a customer support representative via an email request, a live chat application, a screen-share session, a telephone call and/or the like. The customer support representative may use a support system to respond to the user's request for assistance.

As illustrated by FIG. 1, a system 100 may include a customer relationship management (CRM) system 102, a solution management system 104, a solution data store 106 and a search accuracy system 108, and/or one or more print devices 110. In various embodiments, a CRM system 102, a solution processing system 104, a solution data store 106 and a search accuracy system 108 may be operated or administered by a common operator. Alternatively, two or more operators may operate or administer different system 100 components. One or more print devices 110 may communicate with the solution processing system 104 and/or the CRM system 102 via one or more communication networks. The solution processing system 104, the CRM system 102, and/or the search accuracy system 108 may communication with one another via one or more communication networks. A communication network may be a local area network (LAN), a wide area network (WAN), a mobile or cellular communication network, an extranet, an intranet, the Internet and/or the like.

A CRM system 102 may include one or more electronic devices. A user (such as a user seeking assistance or a customer support representative assisting a user) may interact with a CRM system 102 via one or more electronic devices such as, for example, a tablet, a laptop, a desktop, a mobile device and/or the like. A CRM system 102 may manage the interaction with a user or customer. It may collect problem descriptions, device fault codes and other ancillary input information.

A solution processing system 104 may include one or more electronic devices. A solution processing system 104 may receive input data pertaining to a support request such as, for example, ticket number, employee identifier, product identifier, product or other tags, serial number, and/or the like. The solution processing system 104 may keep track of the input data during a session. During a session, a solution processing system may associate other data with that particular session such as keywords used during searches and solutions viewed. A solution processing system may record exit conditions for the session.

A solution data store stores content representing solutions to various technical support issues associated with a print device such as, for instance, a jammed paper tray, loss of power, low toner and/or the like. One or more of the solutions may be tagged by keywords, search phrasing and/or the like. In certain embodiments, one or more of the solutions may be associated with a weight value, a ranking, an index and/or the like. A solution data store 106 may maintain a solution index as further discussed below.

A search accuracy system 108 may include one or more electronic devices and one or more data stores.

In various embodiments, a solution processing system 104, a CRM system 102, a solution data store 106, and a search accuracy system 108 may communicate with one another or with one or more of the other system 100 components via a communication network such as a local area network or a wide area network, for example the Internet, the World Wide Web or the like.

Figure 2A:
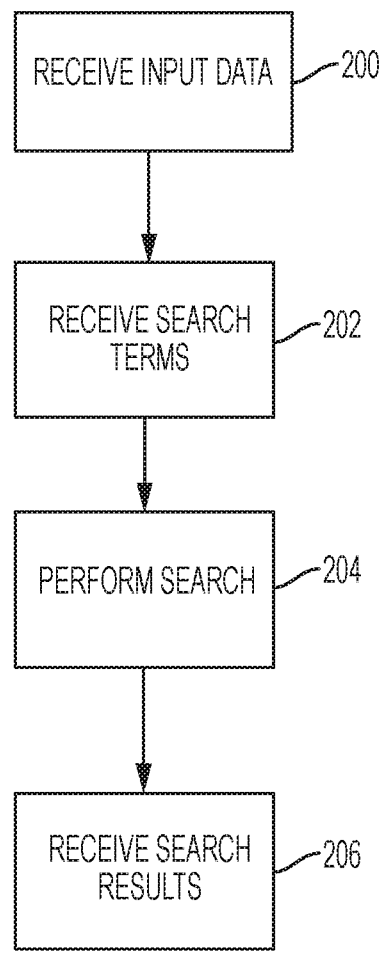
FIGS. 2A-2C illustrate flow charts of example methods of processing support requests according to various embodiments.
Figure 2B:
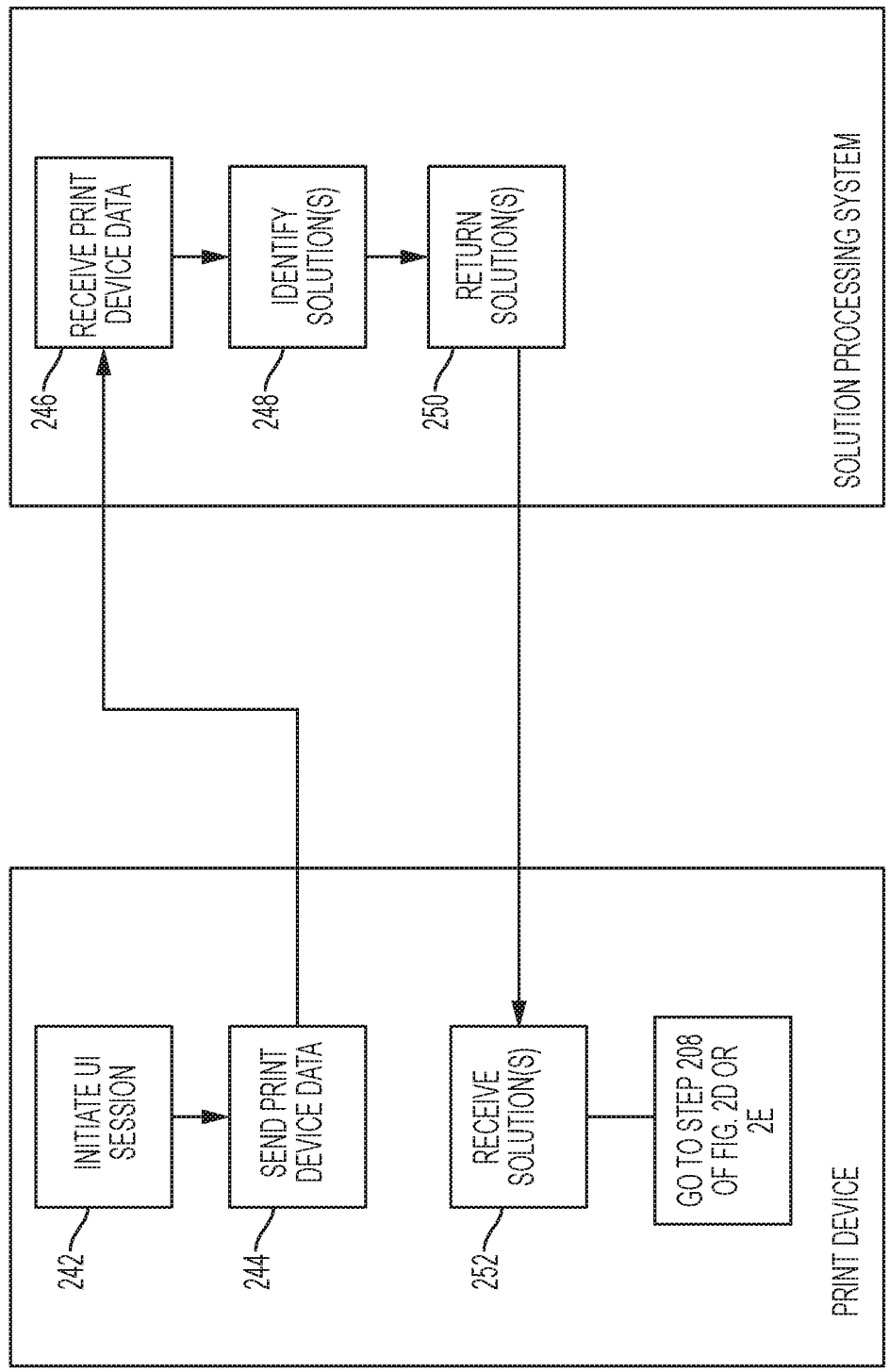
Figure 2C:
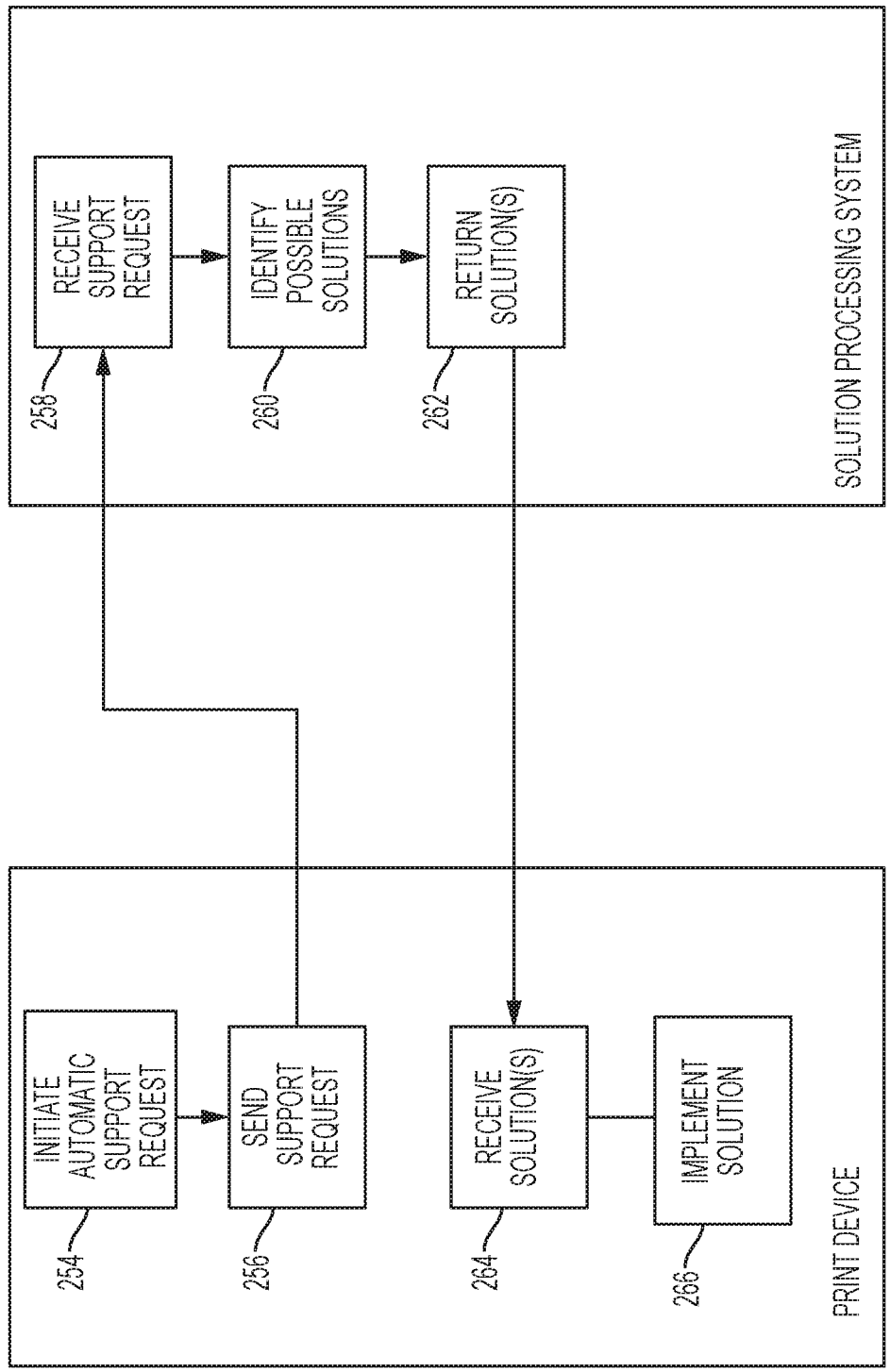
Figure 2D:
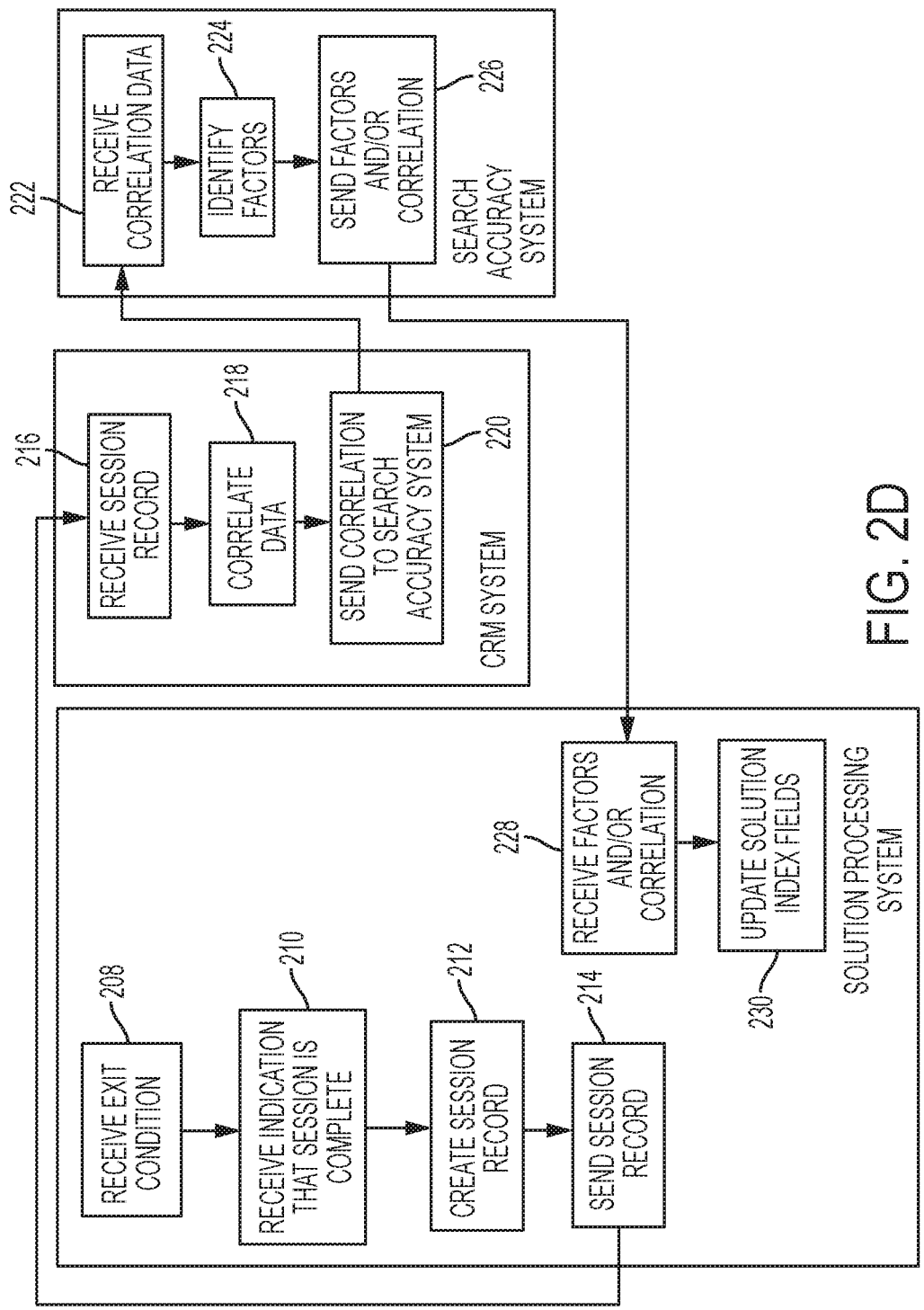
FIGS. 2D-2E and 3 illustrate flow charts of example methods of managing a data set of knowledge for print device support requests according to various embodiments.
Figure 2E:
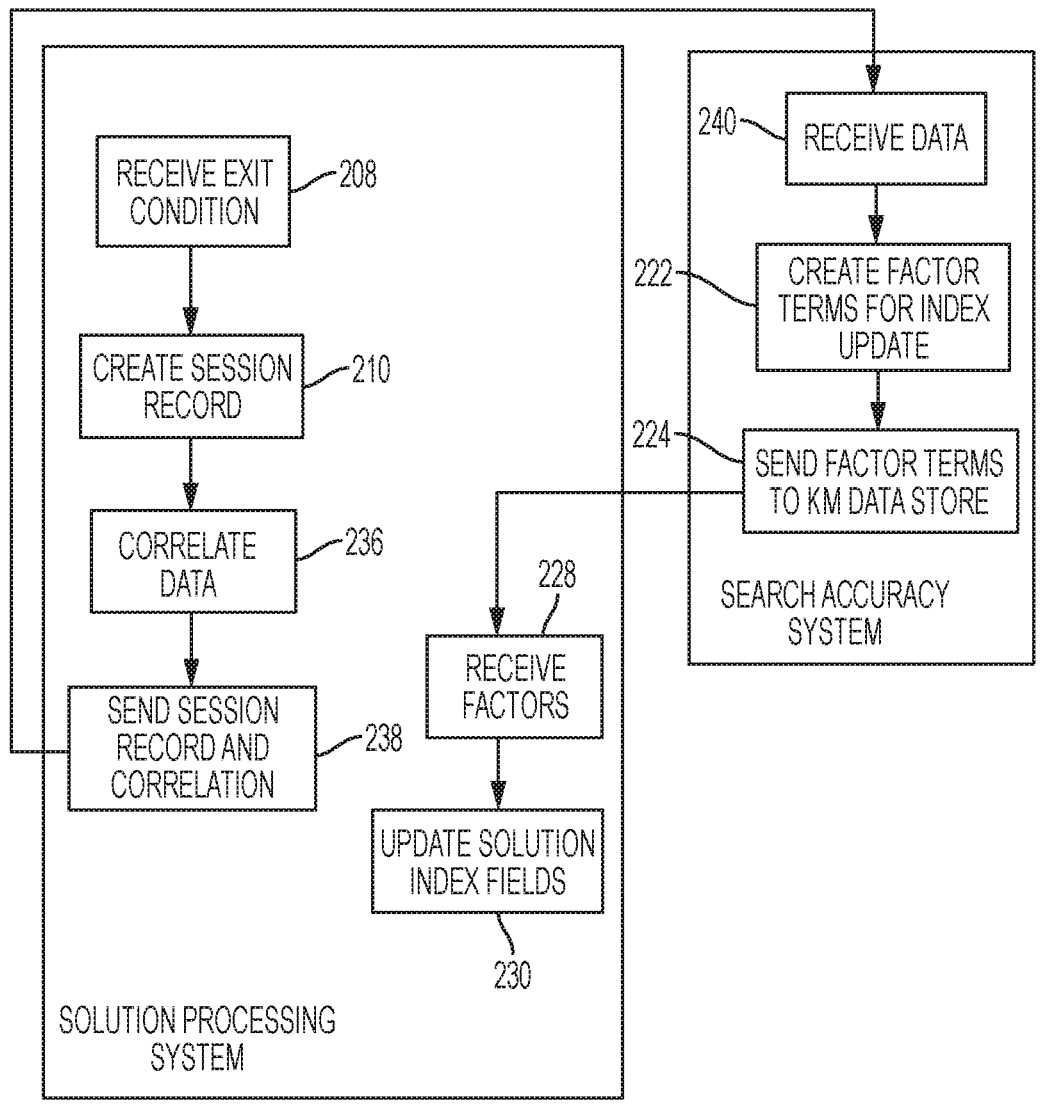
Figure 3:
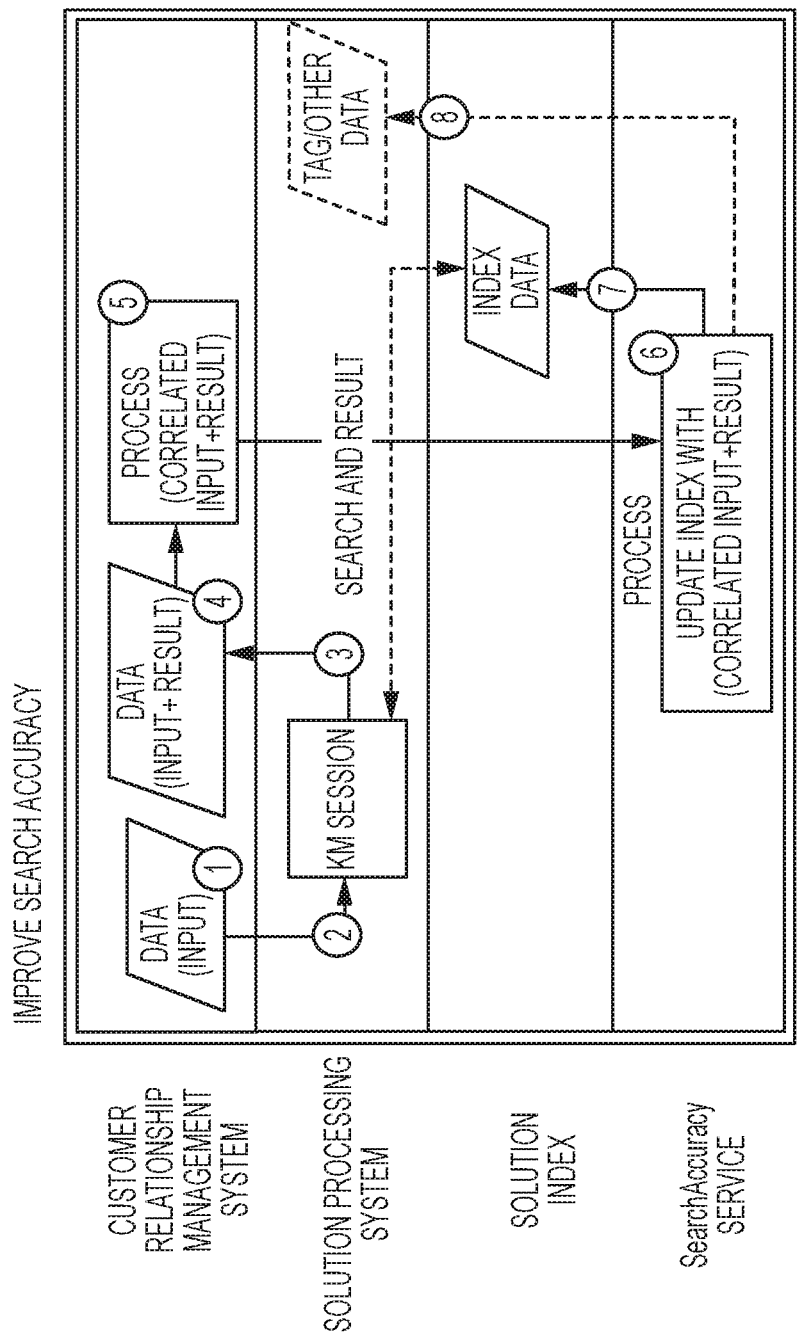

The methods illustrated by FIGS. 2A-2E and/or FIG. 3 may be used with user-driven support requests such as, for example, a user interacting directly with a searchable online help solution such as, for example a website. The method may also be used in agent-driven situations such as, for example, a user interacting with a customer or technical support agent via phone, web chat, a product user interface session and/or other communication methods. In various embodiments, as discussed below, the method may also be performed, at least in part, by a print device that is experiencing an issue for which a solution is sought.

FIGS. 2A-2C each illustrate example methods of processing support requests according to an embodiment. FIG. 2A illustrates an example method of processing a support request that is generated online by a user or an agent. FIGS. 2B and 2C illustrate example methods of processing support requests that are generated via a print device according to various embodiments. FIG. 2D illustrates an example method of managing a data set of knowledge for print device support requests that involves a CRM system. FIG. 2E illustrates an example method of managing a data set of knowledge for print device support requests that does not involve a CRM system.

A solution processing system outputs a user interface that a user can use to provide information and/or queries to the solution processing system. Referring to FIG. 2A, the solution processing system receives 200 input data via the user interface. Alternatively, a CRM system may output a user interface, and receive input data via the user interface. Input data may be received 200 from a user, an electronic device or a system. Input data may include information pertaining to a support request in a CRM system. A support request may include a request from a user for help regarding a product or a service. In an embodiment, a support request may be a customer support request such as, for example, a request for help configuring settings of a new print device. In another embodiment, a support request may be a technical support request such as, for example, a request for help fixing a jam in a print device.

In various embodiments, a support request may include a request from an electronic device requesting assistance on behalf of a user. For instance, a print device may generate and send a support request for assistance replacing toner on behalf of a user of the print device. In another embodiment, a support request may include a request from an electronic device requesting assistance without the involvement of a user. For instance, a print device may generate and submit a support request seeking a solution for increased misfeed occurrences, updated paper path timing values and/or the like. Additional and/or alternate support requests may be used within the scope of this disclosure.

In an embodiment, input data may include, for example, a problem description, a ticket number, an employee identifier (in the case of an agent assisting with a support request), a product identifier, a serial number, one or more fault codes associated with one or more machines to which a support request pertains and/or the like. In certain embodiments, a problem description may include one or more words, terms or phrases provided by a user to summarize the encountered issue. For instance, with respect to support requests for a print device, a user-provided problem description may include "crinkled paper at exit."

In various embodiments, a fault code may pertain to an issue or issues experienced by equipment to which a support request corresponds. For instance, for the print device mentioned above, the print device may display a fault code to a user. The user, in turn, may provide the fault code to a solution processing system along with a problem description. Alternatively, a print device may send a fault code directly to a solution processing system.

As an example, a user may be experiencing a jammed paper feeder of a print device. The print device may be displaying an error code "10-104." The user searches the product self-help website using the search terms "wrinkled paper." However, no solutions are returned. The user then calls a product support telephone number and is connected to a support agent. After listening to the user's issues, the agent may provide input data to the system that includes a description of the problem (paper jam and wrinkled paper) as well as the error code (10-104).

A solution processing system may receive 202 a query that includes one or more search terms. A solution processing system may receive 202 one or more search terms from a user or an agent. The search terms may pertain to the support request. Referring to the above example, the support agent may search on the terms "accordion jam" as the agent is better informed than the user as to the technical name for the issue. Optionally, the agent may search on the terms ("accordion jam" OR "wrinkled paper") so the user's query language ("wrinkled paper") is searched along with the agent's search, and associated with whatever resolution is obtained for the support request. FIG. 9 illustrates example input data and search terms according to an embodiment.

In an embodiment, a solution processing system may query a solution data store to perform a search 204. The search query may originate at the solution processing system via its user interface, or from an external system, such as, for example, at a CRM system through the solution processing system's services (such as, for instance, a search-focused service). The solution processing system may generate a search query that includes one or more of the input data and/or the search terms. For instance, a solution processing system may generate a search query that includes at least a portion of the input data and/or search terms, and may perform a search 204 of a solution data store or search platform, which stores all or part of the solutions being searched, using the formed search query. The solution data store may return as a result one or more possible solutions to the support request, and the result(s) may be received 206 by the solution processing system. For instance, a possible solution for the example support request above may be ContentABC789 which advises to "clear paper jam in area 3." In certain embodiments, a possible solution may be associated with a unique identifier or code.

The solution data store may return a list of possible solutions to the support request. The solution processing system outputs, via the user interface, the list of possible solutions. The solution processing system receives a selection of one or more of the possible solutions from the list. The selection may be made by a user of the solution processing system, such as the user seeking a solution to the support request, or an agent assisting the user.

FIG. 2B illustrates a flow chart of an example method of submitting and processing a support request using a print device according to an embodiment. As shown in FIG. 2B, a print device may initiate 242 a user interface session. The print device may initiate 242 a user interface session on a display of the print device. The print device may initiate 242 a user interface session in response to user input. The print device may initiate 242 a user interface session automatically in response to an action at the print device such as, for example, powering on the print device.

The print device may send 244 a support request to a solution processing system. The support request includes print device data pertaining to an issue being experienced by the print device. For example, the support request may include a fault code associated with an issue being experienced by the print device, one or more identifiers associated with the print device such as a model number, a serial number and/or the like.

As shown in FIG. 2B, the solution processing system receives 246 the support request from the print device. For example, the solution processing system may receive 246 the support request from the print device via a communication network. The solution processing system may extract at least a portion of the print device data from the support request.

The solution processing system identifies 248 one or more possible solutions to the support request using the extracted print data. For example, the solution processing system may generate a query using the extracted print data. The solution processing system may send the query to the solution data store, which may identify one or more solutions in response to the query.

The identified solutions may be ones having a certain weight value associated with at least a portion of the extracted print data. For instance, an identified solution may be one with a highest weight value, a weight value that exceeds a threshold value, a weight value within a range of values and/or the like. For example, the print data may include a fault code associated with the issue the print device is experiencing. The solution processing system may generate a query that includes the fault code in order to search the solution data store for solutions associated with the same fault code. The solution data store may return one or more solutions having a highest weight value for the fault code. Alternatively, the solution data store may return one or more solutions having a weight value for the fault code that exceeds a threshold value, is within a range of threshold values and/or the like.

The solution processing system returns 250 the identified solution(s) to the print device, and the print device may receive 252 the solution. For example, the solution processing may send the identified solutions to the print device over a communication network. The print device displays the solutions on its user interface. A user may follow the instructions provided by one or more of the displayed solutions to try and resolve the support request. As illustrated by FIG. 2B, the method proceeds to step 208 as illustrated in FIG. 2D or 2E.

FIG. 2C illustrates a flow chart of an example alternative method of submitting and processing a support request using a print device according to an embodiment. As illustrated by FIG. 2C, a print device may automatically initiate 254 a support request. A print device may automatically initiate 254 a support request in response to experiencing one or more issues. For example, if a print device experiences an issue having the same fault code a certain number of times, or a certain number of times within a certain period of time, the print device may automatically initiate 254 a support request.

The print device sends 256 the support request to a solution processing system. The support request includes print device data pertaining to the issue being experienced by the print device. For example, the support request may include a fault code associated with an issue being experienced by the print device, one or more identifiers associated with the print device such as a model number, a serial number and/or the like.

As shown in FIG. 2C, the solution processing system receives 258 the support request from the print device. For example, the solution processing system may receive 258 the support request from the print device via a communication network. The solution processing system may extract at least a portion of the print device data from the support request.

The solution processing system identifies 260 possible solutions to the support request using the extracted print data. For example, the solution processing system may generate a query using the extracted print data. The solution processing system may send the query to the solution data store, which may identify one or more solutions in response to the query.

The identified solution may be one having a certain weight value associated with at least a portion of the extracted print data. For instance, an identified solution may be one with a highest weight value, a weight value that exceeds a threshold value, a weight value within a range of values and/or the like. For example, the print data may include a fault code associated with the issue the print device is experiencing. The solution processing system may generate a query that includes the fault code in order to search the solution data store for solutions associated with the same fault code. The solution data store may return the solution having the highest weight value for the fault code. Alternatively, the solution data store may return a solution having a weight value for the fault code that exceeds a threshold value, is within a range of threshold values and/or the like.

The solution processing system returns 262 the identified solution(s) to the print device, and the print device may receive 264 the solution. For example, the solution processing system may send the identified solutions to the print device over a communication network.

The print device may implement 266 the solution. In an embodiment, the solution includes one or more machine-readable instructions for implementing the solution. For instance, the solution may include a patch and one or more instructions for implementing the patch. As another example, the solution may include one or more instructions for changing one or more settings of the print device. By executing the instructions, the print device may change its applicable settings and thus implement the solution.

The print device may implement the solution by executing the instructions included in the solution in an attempt to resolve the issue. This implementation may be performed automatically by the print device, or in conjunction with input provided by a user of the print device. As illustrated by FIG. 2C, the method proceeds to step 208 as illustrated in FIG. 2D or 2E.

For each selection, a solution processing system may receive 208 an exit status associated with the request and the possible solution that corresponds to the selection. An exit status may indicate a resolution status for a support request, and may be received 206 from a user or an agent. Example exit conditions may be "Solved," "Service Call Placed," and "Solution Not Found." In various embodiments, a solution processing system may receive 208 an exist status from an electronic device in response to input provided by a user or an agent. For instance, in the above example, the support agent may offer the solution described by ContentABC789 to the user. The user may inspect area 3 of the print device and clear the print jam. This resolves the issue, and the support agent provides an indication that the exit status of the support request is "Solved." In another embodiment, a solution processing system may receive 208 an exit status from a print device. The exit status may be provided in response to input provided by a user. Alternatively, the print device may automatically send an exit status to the solution processing system depending on whether a solution resolves an issue.

In another embodiment, an exit status may be created for a session in a CRM system, which may be consumed by systems not shown in the figures. Additional and/or alternate exit conditions may be used within the scope of this disclosure.

A solution processing system may receive 210 an indication that the session pertaining to the support request is complete. For example, receiving an indication that the exit status for the session is "Solved" may automatically indicate that the session is complete. As another example, a separate indication may be received by the solution processing system. For instance, a user (such as a user or an agent) may provide input to the solution processing system indicating that the session is complete. Complete may not necessarily mean resolved. For example, a solution to a particular support request may not have been found during a session. An agent assisting with the support request may need to investigate the request further or seek input from a supervisor. As such, the session may be assigned an exit status of "Not Resolved" but the session may be completed.

Figure 7:
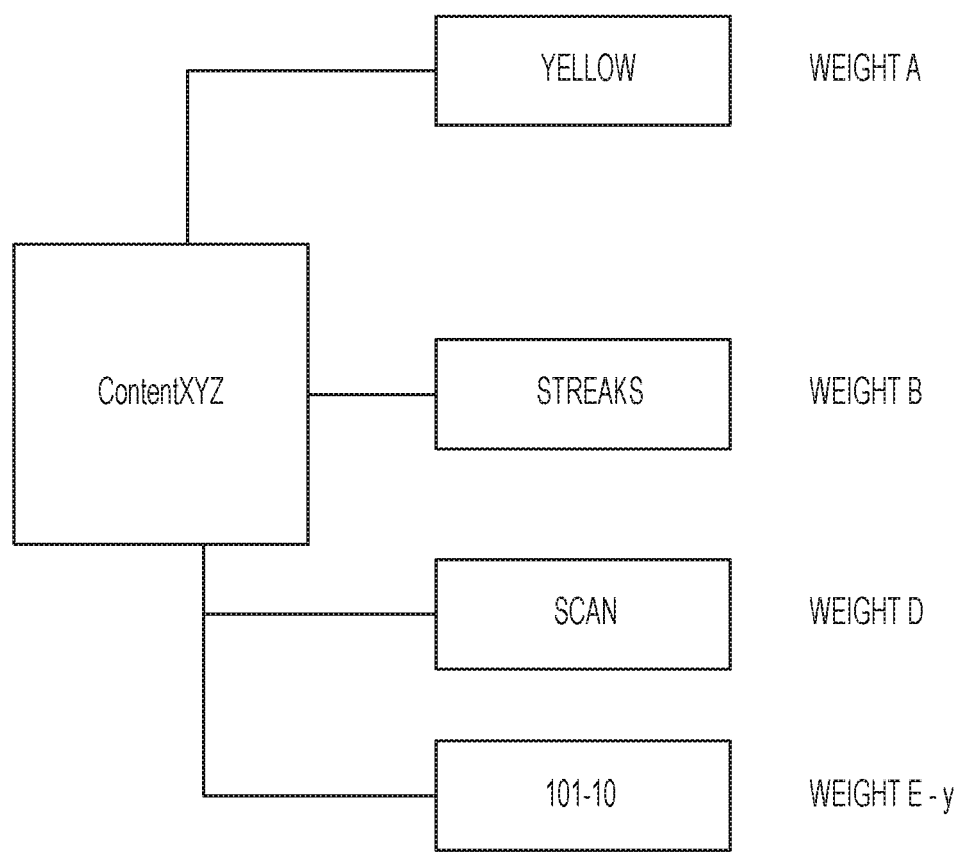
FIG. 7 illustrates an example solution index according to an embodiment.

Once the session is complete, a solution processing system may create 212 one or more solution session records for the session. The solution processing system may create 212 a solution session record for each selection. A solution session record may include information associated with a corresponding support request such as, for example, the input data, the search terms, the returned possible solution(s) for the applicable selection, and/or corresponding identifiers, an exit status, a request identifier and/or the like. FIG. 7 illustrates an example solution session record for the above example according to an embodiment.

A solution processing system may send 214 the solution session records to the CRM system. The CRM system may receive 216 the solution session records. The CRM system may store session records for other sessions across other users and support requests. As such, the data stored by the CRM system reflects a number of sessions where the input data sets are known and the results of the session (solutions and exit statuses) are known. This provides a view from the beginning to the end of many sessions. The intersection of the input sets across common solutions can be used to more accurately identify a correct solution to subsequent support requests.

In certain embodiments, the CRM system may correlate 218 the input data and/or search terms with the possible solution(s) for one or more of the selections. For a single CRM ticket, the correlation may be a one-to-one relationship between the input data and/or search terms and the possible solution. At a system level, the correlation may be associated with a particular exit status. For example, if Content123 solves 500 cases, the correlation may include the intersection of fault codes for those 500 cases, the intersection of the problem description words across those 500 cases, and the intersection of search terms across those 500 cases.

Figure 8A:
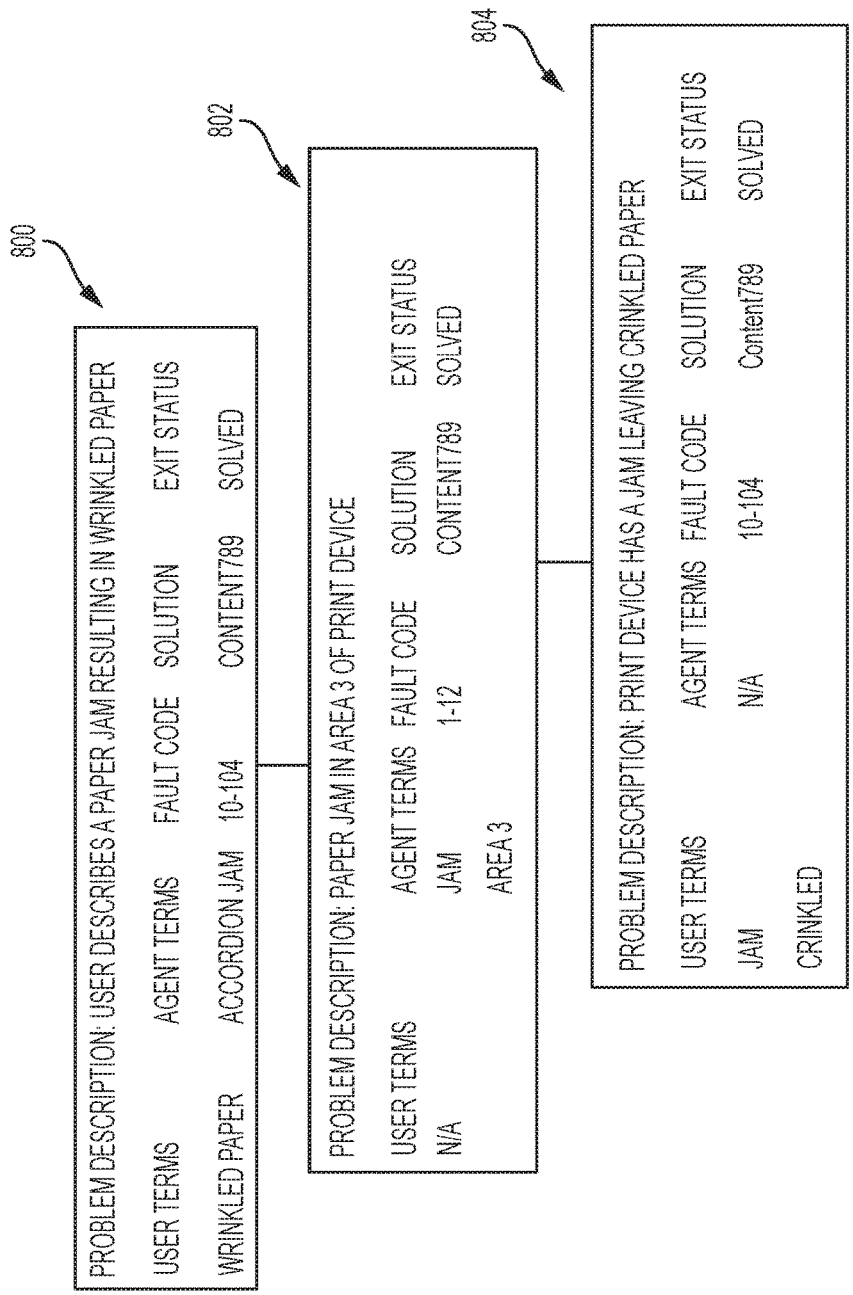
FIGS. 8A and 8B illustrate example correlations according to various embodiments.

Referring to the above example, FIG. 8A illustrates a correlation between session records 800, 802, 804 for Content789 that have an exit status of "Solved." Although FIG. 8A illustrates three such records, it is understood that additional and/or alternate records or number of records may be used within the scope of this disclosure. FIG. 8A shows that the correlated session records 800, 802, 804 are correlated to one another by links, pointers, direct references and/or the like. A correlation may refer to the linked session records.

Figure 8B:
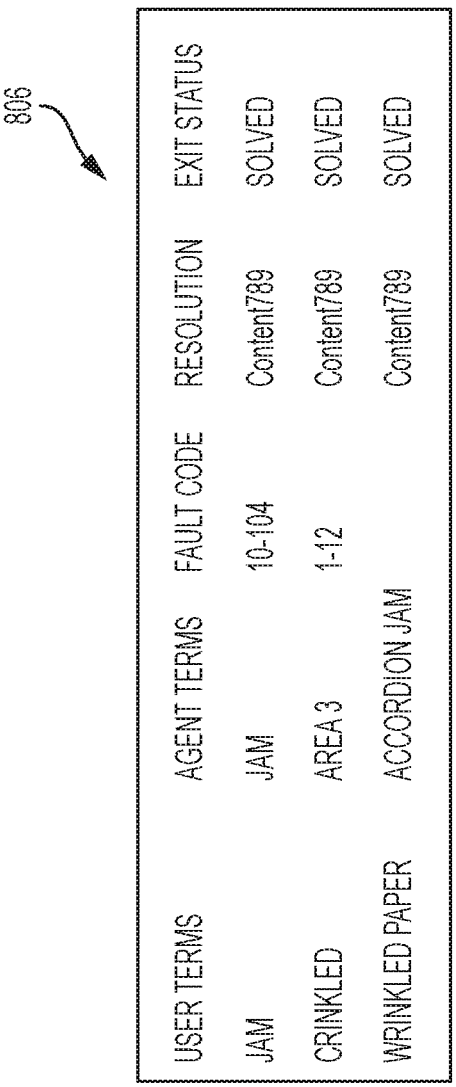

Alternatively, the CRM session may generate a correlation session record for the correlated information and data, and a correlation may refer to the correlation session record. FIG. 8B illustrates an example correlation session record for the session records illustrated in FIG. 8A according to an embodiment. As shown by FIG. 8B, the correlation session record 806 includes an intersection of data across user terms, agent terms, fault code, resolution and exit status.

The CRM system may send 220 the correlation(s) back to the solution processing system to impact and inform future queries and solutions. In an embodiment, the CRM system may send 220 the correlation to a search accuracy system, and the search accuracy system may receive 222 the correlation.

In an alternate embodiment, as illustrated by FIG. 2B, a solution processing system may correlate data 236 as described in the manner above, and may send 238 the correlation directly to a search accuracy system. In that case, the search accuracy system may receive 240 the correlation directly from the solution processing system.

As shown by both FIG. 2A and FIG. 2B, a search accuracy system may identify 224 one or more factors to associate with one or more of the possible solutions. A search accuracy system may identify one or more factors from the received correlation. A factor may be any data that is pertinent to the association between the support request and the solution. Example factors may be one or more terms or phrases from the problem description, one or more search terms, one or more fault codes and/or the like.

In various embodiments, a factor may include a synonym for one or more words or phrases such as, for instance, problem description terms, search terms and/or the like. For instance, referring to the above example, a search term is "jam." A search accuracy system may generate a factor that includes the work "stuck" as a synonym for "jam."

The search accuracy system sends 226 the identified factors and/or the correlation to the solution processing system. The solution processing system receives 228 the factors and/or the correlation. The solution processing system uses at least a portion of the received information to update 230 one or more fields of the solution index for the applicable solution. Updating one or more fields may include associating terms or other information with a solution if such terms or information is not already associated. Updating one or more fields may include adjusting a weight value associated with terms or information that is already associated with the solution.

The solution processing system may determine whether a factor is already present in the solution index for the solution. If it is not, the system may add the factor to the index. If it is present, the system may determine whether the exit status indicates that the support request has been resolved. If so, the system may increment the weight value of the factor by a certain value. Otherwise, the system may decrement the weight value of the factor by a certain value.

For instance, if the solution is associated with an exit status for a session record indicating that the solution solved the problem, a weight value associated with the relevant solution index fields may be incremented by a certain value. As another example, if the solution is associated with an exit status for a session record that indicates that the solution did not solve the problem, a weight value associated with the relevant solution index fields may be decremented by a certain value.

Figure 4B:
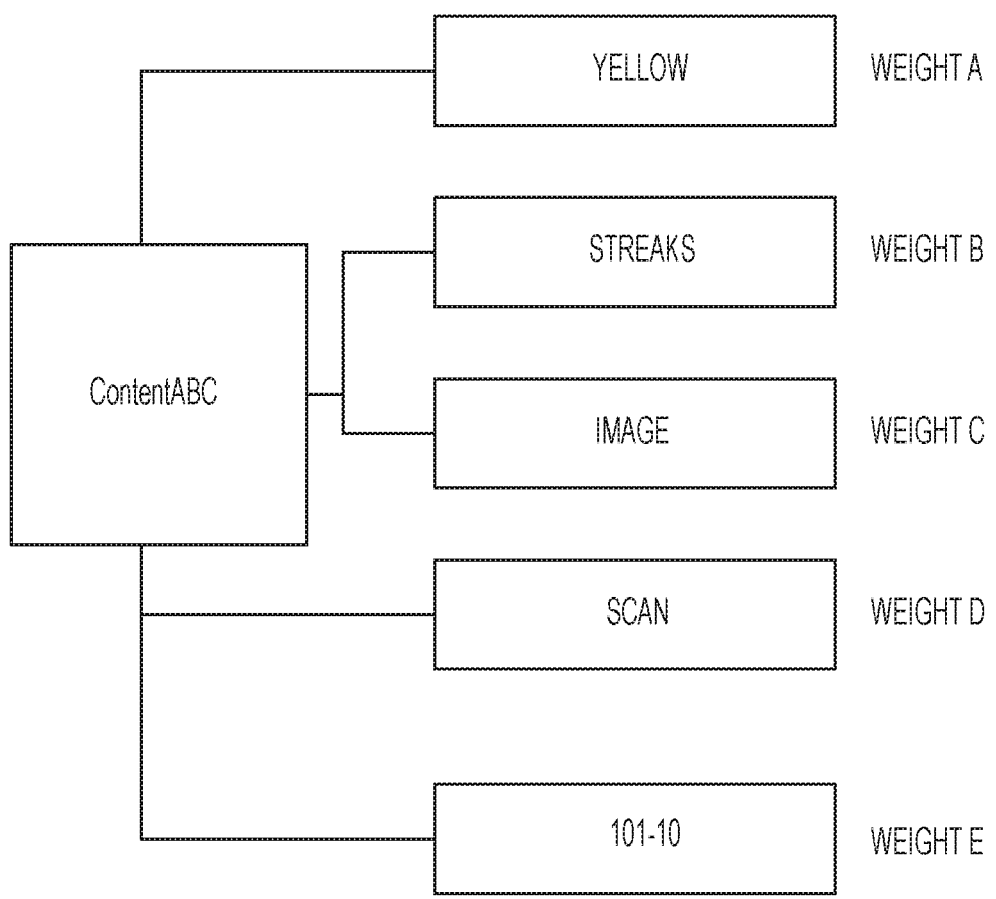
FIG. 4B illustrates an example solution index according to an embodiment.

FIG. 4B illustrates an example representation of a portion of a solution index according to an embodiment. The portion of the solution index shown in FIG. 4B corresponds to the session record illustrated in FIG. 4A. It is assumed, for ease, that the solution ContentABC is first identified as a possible solution is with respect to the session record shown in FIG. 4A.

As shown in FIG. 4B, the solution index includes factors selected from the problem description, the fault code and the search terms (e.g., yellow, streaks, scanned images, scan and 101-10). Each factor is assigned a field, and a weight value is assigned to each. A weight value may be assigned based on an exit status. In certain embodiments, a weight value may be adjusted dynamically through a search accuracy system. A higher value may be used to seed the system and may be lowered to lessen variability across a longer duration.

Figure 5B:
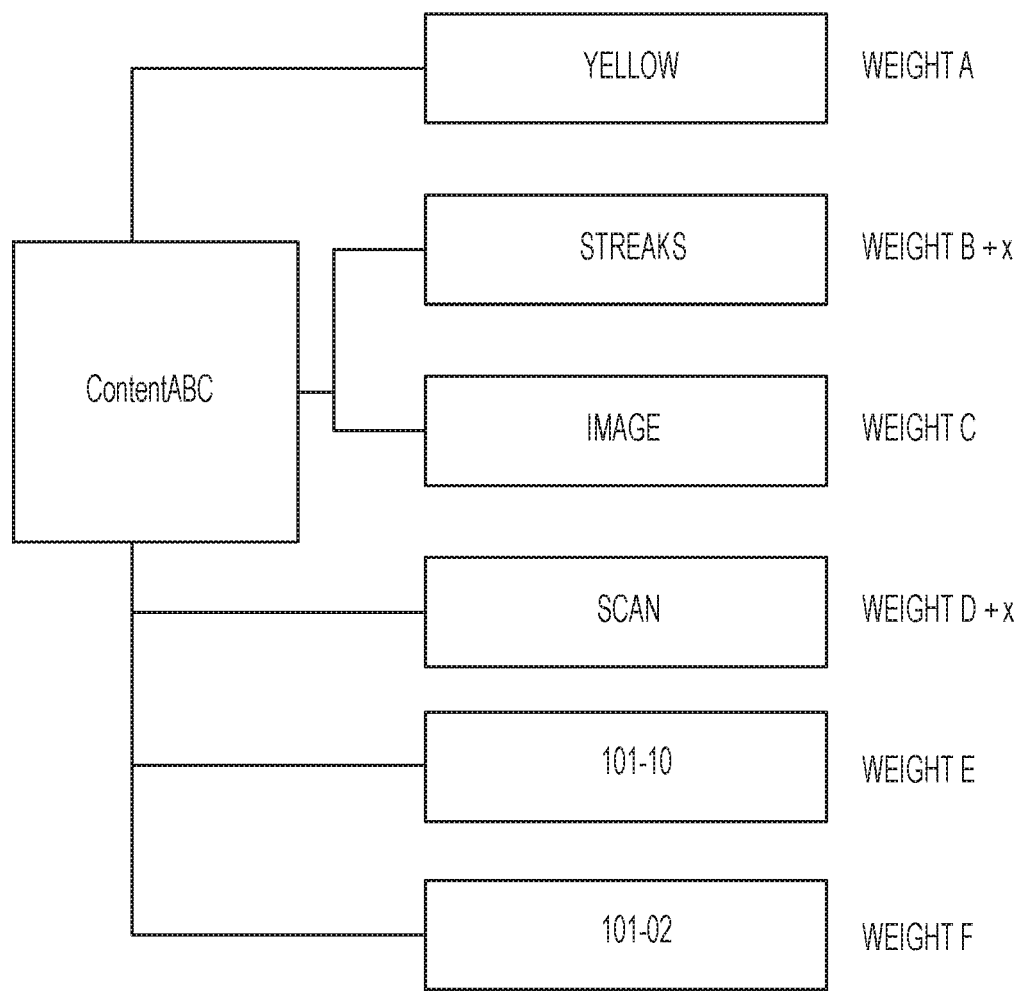
FIG. 5B illustrates an example solution index according to an embodiment.

FIG. 5A illustrates another example session record for a session that also identified ContentABC as the solution. The session may be for the same user as the session represented in FIG. 4A, or it may be for a different user. FIG. 5B illustrates an updated search index and fields corresponding to the solution after conclusion of the subsequent session. As shown in FIG. 5B, the system selects an additional factor (fault code 101-02) to associate with the solution. It also identifies the terms "streaks" and "scan" as factors from the problem description and search terms. Because these factors are already associated with the solution, and the solution solved the problem (as indicated by the exit status in the session record) the system may increment the weight value of these factors by a certain value (represented in FIG. 5B by 'x'). Although FIG. 5B shows the weight values being incremented by the same value, it is understood that different or alternate values may be used within the scope of this disclosure.

Figure 6B:
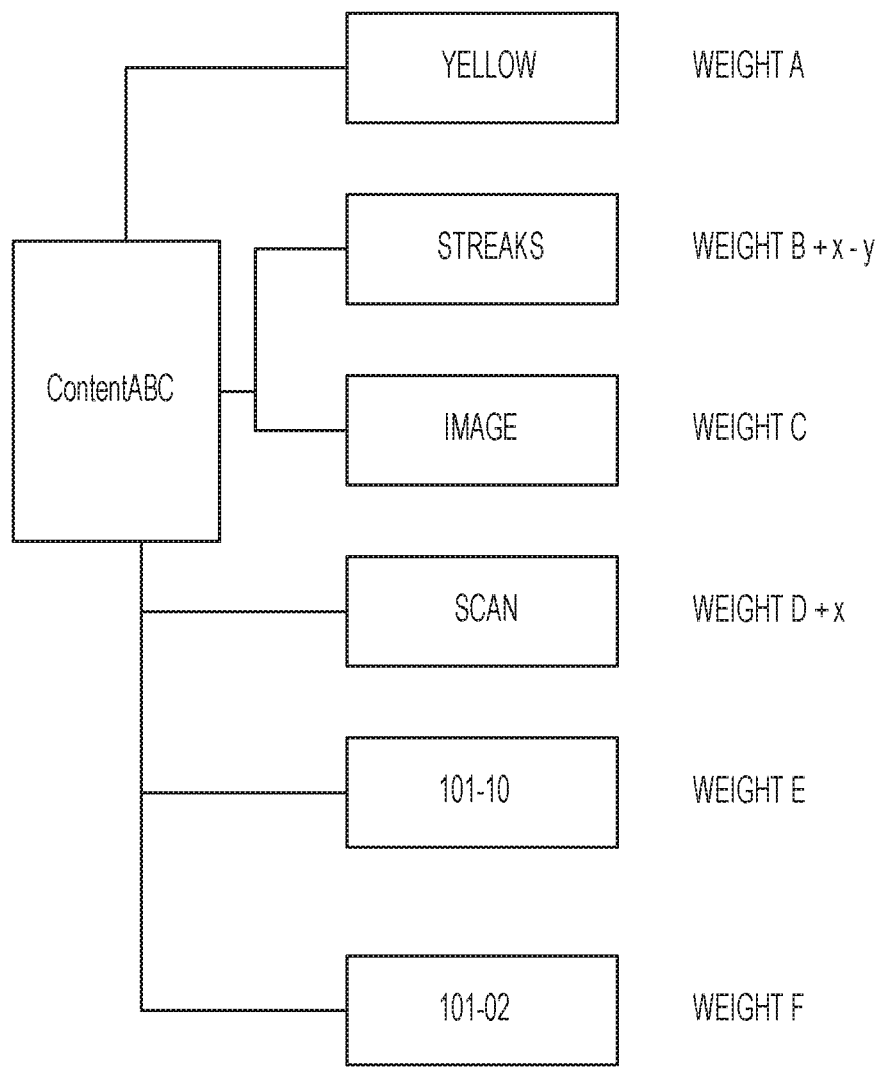
FIG. 6B illustrates an example solution index according to an embodiment.

FIG. 6A illustrates another example session record for a session that also identified ContentABC as the solution. The session may be for the same user as the session represented in FIG. 4A and/or FIG. 5A, or it may be for a different user. FIG. 6B illustrates an updated search index and fields corresponding to the solution after conclusion of the subsequent session. As shown in FIG. 6B, the system identifies the term "streaks" as a factor from the problem description and search terms. Because this factor is already associated with the solution, the system may decrement the weight values of this factor by a certain value (represented in FIG. 6B by 'y'). This is because the solution did not solve the problem, as indicated by the exit status in the session record.

When the solution index is queried for solutions to a particular support request, data fed into fields of the solution index that have a higher weight value will be scored more heavily than those with a lower weight value for those fields. As such, a search looking at the solution index will be tuned to more heavily score results found in the solution index that were updated by the correlated date.

In an embodiment, the system may receive a subsequent support request that is associated with input data and one or more search terms. At least a portion of the input and/or search terms for the subsequent support request may include one or more factors associated with an existing solution in the solution data store. The system may generate a search query based on the received input data and the received second search terms for the subsequent support request. The system may query the solution data store using the search query. The solution data store may return one or more possible solutions from the solution data store based on the search query. The system may cause these possible solutions to be displayed to a user in an ordered sequence. The sequence may convey an indication of the likelihood that the possible solutions will solve the support request. For instance, the solution that is first in the sequence has a greater likelihood of solving the support request that the solution that is next in the sequence. The position of the possible solutions may be based on the weight value associated with the factors for the possible solutions.

For instance, solution Content123 (whose solution index is illustrated in FIG. 5B) would have a higher score than solution ContentXYX (whose solution index is illustrated in FIG. 7) for a search query for the term "streaks" and fault code "101-10." As shown in FIG. 5B, the weight value associated with "streaks" for solution Content123 (B+x) is higher than the weight value associated with "streaks" for solution ContentXYZ (B), and the weight value associated with fault code "101-10 " for solution Content123 (E) is higher than the weight value associated with fault code "101-10" for solution ContentXYZ (E−y).

Higher rated solutions may be presented to a user higher in a prioritized list of solutions. For instance, solutions Content123 and ContentXYZ may both be returned to a user as possible solutions to a support request for "streaks" and fault code "101-10." However, solution Content123 may be presented first in the results list, and solution ContentXYZ may be presented second or somewhere lower in priority in the results list than Content123.

Additional examples are provided below to illustrate certain described features of the system.

Example 1

A user purchases a multifunction device. He is using the scanner and notice lines on the images that the scanner creates. The user connects to a product self-help page and types "streaks on image." One of the solutions returned, Content ABC123, contains instructions how to clean the scanner glass with a dry towel. The user follows the instructions and solves the problem. The user indicates in the self-help page that the solution (Content ABC123) solved his problem. Subsequently, Content ABC123 is used to solve problems pertaining to scanners and searches containing the words "image" and "streaks." Each time the Content123 is marked as solving a problem, its score relative to the words "image" and "streaks" will increase. Over time, Content123 will be the first result or very near the top of the search result list for problems involving scanners and the words "image" and "streaks."

Example 2 a second user who has a similar scanner to that in Example 1 is also experiencing marks on scanned images. The user connects to a product self-help page and enters "streaks on image." One of the solutions returned, Content ABC456 contains the words image and streaks but is written for a different product with a similar scanner. The user finds that this content is more helpful than Content ABC123 as it advises using platen glass cleaner to remove the marks from the glass and this fixes the problem. As more users find this solution helpful, its placement in the result list with searches containing image and streaks will increase. As more users mark this content as solving their problem this content may eventually be higher in the list than Content ABC123.

Example 3

When solution processing system content authors review usage of Content ABC123 and Content ABC456, they could decide to add a couple tips to Content ABC456 and delete Content ABC123 from the content library. This could reduce confusion and be one less content to maintain. The boosting factor values could be compared to help in this decision.

Example 4

Content DEF123 is frequently accessed to solve a problem with a scanner with searches containing the words "image" and "streaks." However, no user has ever indicated that this content has solved his or her problem. The system will reduce the score on this content for the terms "image" and "streaks." Eventually it may not even show on the results list as other content has proved (potentially) more useful. Additionally, many solution processing systems retire or archive content rather than delete it. The search accuracy factors may reach a negative value when decremented over time. A threshold value when reached can be used to indicate what content can be systemically retired/archived by a process/method. When content authors review usage of DEF123 they could decide DEF123 is not useful and delete it. This would reduce confusion and be one less content to maintain.

Figure 10:
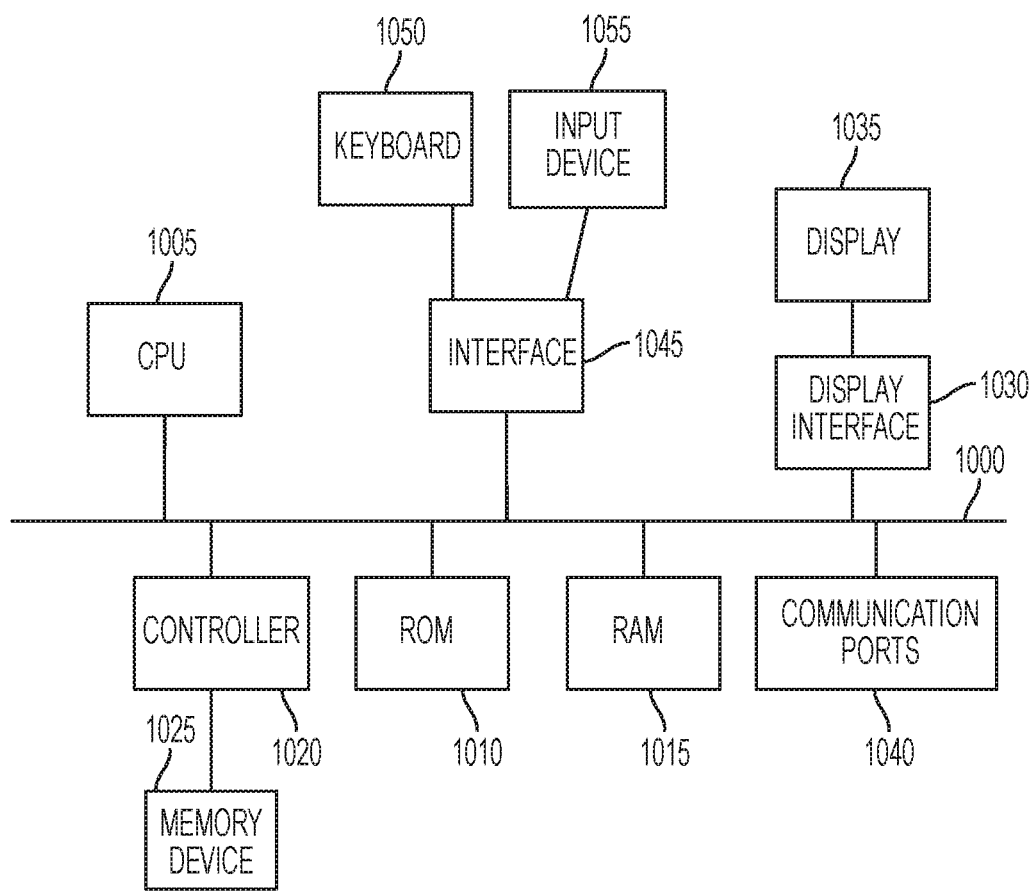
FIG. 10 illustrates a block diagram of example hardware that may be used to contain or implement program instructions according to an embodiment.

FIG. 10 depicts a block diagram of hardware that may be used to contain or implement program instructions. A bus 1000 serves as the main information highway interconnecting the other illustrated components of the hardware. CPU 1005 is the central processing unit of the system, performing calculations and logic operations to execute a program. CPU 1005, alone or in conjunction with one or more of the other elements disclosed in FIG. 10, is an example of a production device, computing device or processor as such terms are used within this disclosure.

CPU 1005 represents one or more processors that perform calculations and logic operations to execute a program. Any number of processors may be available, and they may be part of a single electronic device or distributed across any number of networked electronic devices. The processor(s) may access a computer-readable memory device 1025 containing programming instructions.

When this document and any claim uses the term "processor," then unless specifically stated otherwise it is intended to refer to all such embodiments (i.e., single processor or multiple processors). When this document or any claim in the document uses the term "computer-readable memory," "computer-readable medium," or similar phrases, unless specifically stated otherwise it is intended to refer to an embodiment that include a single device, embodiments in which data is distributed across multiple devices, and embodiments relating to various sectors of a single device. Read only memory (ROM) 1010 and random access memory (RAM) 1015 constitute examples of non-transitory computer-readable storage media.

A controller 1020 interfaces with one or more optional non-transitory computer-readable storage media 1025 to the system bus 1000. These storage media 1025 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 1010 and/or the RAM 1015. Optionally, the program instructions may be stored on a tangible, non-transitory computer-readable medium such as a compact disk, a digital disk, flash memory, a memory card, a USB drive, an optical disc storage medium and/or other recording medium.

An optional display interface 1030 may permit information from the bus 1000 to be displayed on the display 1035 in audio, visual, graphic or alphanumeric format. Communication with external devices, such as a printing device, may occur using various communication ports 1040. A communication port 1040 may be attached to a communications network, such as the Internet or an intranet.

The hardware may also include an interface 1045 which allows for receipt of data from input devices such as a keyboard 1050 or other input device 1055 such as a mouse, a joystick, a touch screen, a remote control, a pointing device, a video input device and/or an audio input device.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A distributed computing system for managing solutions for print device support requests, the distributed computing system comprising:
 a print device having a user interface;
 a solution data store comprising one or more non-transitory computer-readable media sectors that store content representing a plurality of solutions to a plurality of print device issues;
 a solution processing system in communication with the print device, wherein the solution processing system comprises a processor and programming instructions that are configured to cause the processor to:
  receive a support request from the print device, wherein the support request comprises print device data pertaining to an issue with the print device,
  use the print device data to generate a search query,
  query the solution data store using the search query to identify a list of possible solutions for the support request, wherein each possible solution is associated with a plurality of factors, wherein each factor has a weight value, return to the print device the list of possible solutions for display to a user of the print device via the user interface,
receive a selection of one or more of the possible solutions,
for each selection:
receive, from the print device, an indication of an exit status for the support request, wherein the exit status represents a resolution to the support request,
generate a session record for the support request comprising the print device data, the possible solution associated with the selection and the exit status,
correlate the possible solution associated with the selection with the print device data,
generate one or more factors based on the correlation, and
use the one or more generated factors to update one or more fields of a solution index in the data store for the possible solution by, for each of the one or more factors:
determining whether the factor is already present in the solution index, and
in response to determining that the factor is not already present in the index, adding a field for the factor to the index and assign the factor a weight value.

2. The distributed computing system of claim 1, wherein the print device data comprises a fault code experienced by the print device, wherein the programming instructions that are configured to cause the processor to query the solution data store using the search query to identify a list of possible solutions for the support request comprise one or more programming instructions that are configured to cause the processor to query the solution data store for a possible solution having a highest weight value associated with the fault code.

3. The distributed computing system of claim 1, wherein the programming instructions that are configured to cause the processor to correlate the possible solution associated with the selection with the print device data comprise programming instructions that are configured to cause the processor to correlate the print device data of the session record with data of each of a plurality of other session records, wherein each other session record is associated with the possible solution associated with the selection and reflects a session having the exit status.

4. The distributed computing system of claim 1, wherein the programming instructions that are configured to use the one or more factors to update one or more fields of a solution index in the data store for the possible solution comprise programming instructions that are configured to cause the processor to:
in response to determining that the factor is already present in the solution index:
determine whether the exit status indicates that the support request has been resolved, and
in response to determining that the exit status indicates that the support request has been resolved, increment a weight value associated with the factor by a certain value.

5. The distributed computing system of claim 1, wherein the programming instructions that are configured to use the one or more factors to update one or more fields of a solution index in the data store for the possible solution comprise programming instructions that are configured to cause the processor to:
in response to determining that the factor is already present in the solution index:
determine whether the exit status indicates that the support request has been resolved, and
in response to determining that the exit status indicates that the support request has not been resolved, decrement a weight value associated with the factor by a certain value.

6. The distributed computing system of claim 1, wherein the solution data store further comprises programming instructions that are configured to cause the processor to:
receive second input data pertaining to a second support request;
receive one or more search terms pertaining to the second support request, wherein at least a portion of the search terms and/or the second input data include one or more of the factors;
generate a second query based on the second input data and the search terms;
query the solution data store using the second query; and
identify a list of possible solutions for the second support request in a sequence, wherein the sequence comprises one or more of the possible solutions to the second support request, wherein a position of each of the possible solutions to the second support request in the sequence is based on the weight value for each factor.

7. A distributed computing system for managing solutions for print device support requests, the distributed computing system comprising:
a print device;
a solution data store comprising one or more non-transitory computer-readable media sectors that store content representing a plurality of solutions to a plurality of print device issues;
a solution processing system in communication with the print device, wherein the solution processing system comprises a processor and programming instructions that are configured to cause the processor to:
receive a support request from the print device, wherein the support request comprises print device data pertaining to an issue with the print device,
use the print device data to generate a search query,
query the solution data store using the search query to identify a possible solution for the support request, wherein the possible solution is associated with a plurality of factors, wherein each factor has a weight value, wherein the possible solution comprises one or more machine-readable instructions for implementing the solution,
return to the print device the possible solution for automatic implementation,
receive a selection of one or more of the possible solutions,
for each selection:
receive, from the print device, an indication of an exit status for the support request, wherein the exit status represents a resolution to the support request,
generate a session record for the support request comprising the print device data, the possible solution associated with the selection and the exit status,
correlate the possible solution associated with the selection with the print device data, generate one or more factors based on the correlation, and use the one or more generated factors to update one or more fields of a solution index in the data store for the possible solution by, for each of the one or more factors:

determining whether the factor is already present in the solution index, and in response to determining that the factor is not already present in the index, adding a field for the factor to the index and assign the factor a weight value.

8. The distributed computing system of claim 7, wherein the print device is configured to:

receive the possible solution from the solution processing system;

extract the machine-readable instructions from the possible solution; and automatically implement the machine-readable instructions.

9. The distributed computing system of claim 7, wherein the print device data comprises a fault code experienced by the print device, wherein the programming instructions that are configured to cause the processor to query the solution data store using the search query to identify a possible solution for the support request comprise one or more programming instructions that are configured to cause the processor to query the solution data store for a possible solution having a highest weight value associated with the fault code.

10. The distributed computing system of claim 7, wherein the programming instructions that are configured to cause the processor to correlate the possible solution associated with the selection with the print device data comprise programming instructions that are configured to cause the processor to correlate the print device data of the session record with data of each of a plurality of other session records, wherein each other session record is associated with the possible solution associated with the selection and reflects a session having the exit status.

11. The distributed computing system of claim 7, wherein the programming instructions that are configured to use the one or more factors to update one or more fields of a solution index in the data store for the possible solution comprise programming instructions that are configured to cause the processor to:

in response to determining that the factor is already present in the solution index:

determine whether the exit status indicates that the support request has been resolved, and in response to determining that the exit status indicates that the support request has been resolved, increment a weight value associated with the factor by a certain value.

12. The distributed computing system of claim 7, wherein the programming instructions that are configured to use the one or more factors to update one or more fields of a solution index in the data store for the possible solution comprise programming instructions that are configured to cause the processor to:

in response to determining that the factor is already present in the solution index:

determine whether the exit status indicates that the support request has been resolved, and in response to determining that the exit status indicates that the support request has not been resolved, decrement a weight value associated with the factor by a certain value.

13. The distributed computing system of claim 7, wherein the solution data store further comprises programming instructions that are configured to cause the processor to:

receive second input data pertaining to a second support request;

receive one or more search terms pertaining to the second support request, wherein at least a portion of the search terms and/or the second input data include one or more of the factors;

generate a second query based on the second input data and the search terms;

query the solution data store using the second query; and identify a list of possible solutions for the second support request in a sequence, wherein the sequence comprises one or more of the possible solutions to the second support request, wherein a position of each of the possible solutions to the second support request in the sequence is based on the weight value for each factor.

14. A method for managing solutions for print device support requests, the method comprising:

receiving, by a solution processing system, a support request from a print device, wherein the support request comprises print device data pertaining to an issue with the print device;

using the print device data to generate a search query;

querying a solution data store using the search query to identify a list of possible solutions for the support request, wherein the solution data store comprises one or more non-transitory computer-readable media sectors that store content representing a plurality of solutions to a plurality of print device issues, wherein each possible solution is associated with a plurality of factors, wherein each factor has a weight value;

returning to the print device the list of possible solutions for display to a user of the print device via a user interface of the print device;

receiving a selection of one or more of the possible solutions;

for each selection:

receiving, from the print device, an indication of an exit status for the support request, wherein the exit status represents a resolution to the support request, generating a session record for the support request comprising the print device data, the possible solution associated with the selection and the exit status, correlating the possible solution associated with the selection with the print device data, generating one or more factors based on the correlation, and using the one or more generated factors to update one or more fields of a solution index in the data store for the possible solution by, for each of the one or more factors:

determining whether the factor is already present in the solution index, and in response to determining that the factor is not already present in the index, adding a field for the factor to the index and assign the factor a weight value.

15. The method of claim 14, wherein:

the print device data comprises a fault code experienced by the print device, querying the solution data store using the search query to identify a list of possible solutions for the support request comprises querying the solution data store for a possible solution having a highest weight value associated with the fault code.

16. The method of claim 14, wherein correlating the possible solution associated with the selection with the print device data comprises correlating the print device data of the session record with data of each of a plurality of other session records, wherein each other session record is associated with the possible solution associated with the selection and reflects a session having the exit status.

17. The method of claim 14, wherein using the one or more factors to update one or more fields of a solution index in the data store for the possible solution comprises:
in response to determining that the factor is already present in the solution index:
determining whether the exit status indicates that the support request has been resolved,
in response to determining that the exit status indicates that the support request has been resolved, incrementing a weight value associated with the factor by a certain value,
in response to determining that the exit status indicates that the support request has not been resolved, decrementing a weight value associated with the factor by a certain value.

18. The method of claim 14, further comprising:
receiving second input data pertaining to a second support request;
receiving one or more search terms pertaining to the second support request, wherein at least a portion of the search terms and/or the second input data include one or more of the factors;
generating a second query based on the second input data and the search terms;
querying the solution data store using the second query; and
identifying a list of possible solutions for the second support request in a sequence, wherein the sequence comprises one or more of the possible solutions to the second support request, wherein a position of each of the possible solutions to the second support request in the sequence is based on the weight value for each factor.

19. A method for managing solutions for print device support requests, the method comprising:
receiving, by a solution processing system, a support request from a print device, wherein the support request comprises print device data pertaining to an issue with the print device;
using the print device data to generate a search query;
querying a solution data store using the search query to identify a possible solution for the support request, wherein the solution data store comprises one or more non-transitory computer-readable media sectors that store content representing a plurality of solutions to a plurality of print device issues wherein the possible solution is associated with a plurality of factors, wherein each factor has a weight value, wherein the possible solution comprises one or more machine-readable instructions for implementing the solution,
returning to the print device the possible solution for automatic implementation;
receiving a selection of one or more of the possible solutions;
for each selection:
receiving, from the print device, an indication of an exit status for the support request, wherein the exit status represents a resolution to the support request,
generating a session record for the support request comprising the print device data, the possible solution associated with the selection and the exit status,
correlating the possible solution associated with the selection with the print device data,
generating one or more factors based on the correlation, and
using the one or more generated factors to update one or more fields of a solution index in the data store for the possible solution by, for each of the one or more factors:
determining whether the factor is already present in the solution index, and
in response to determining that the factor is not already present in the index, adding a field for the factor to the index and assign the factor a weight value.

20. The method of claim 19, further comprising, by the print device:
receiving the possible solution from the solution processing system;
extracting the machine-readable instructions from the possible solution; and
automatically implementing the machine-readable instructions.

21. The method of claim 19, wherein correlating the possible solution associated with the selection with the print device data comprises correlating the print device data of the session record with data of each of a plurality of other session records, wherein each other session record is associated with the possible solution associated with the selection and reflects a session having the exit status.

22. The method of claim 19, wherein updating one or more fields of a solution index in the data store for the possible solution comprises:
in response to determining that the factor is already present in the solution index:
determining whether the exit status indicates that the support request has been resolved;
in response to determining that the exit status indicates that the support request has been resolved, incrementing a weight value associated with the factor by a certain value, and
in response to determining that the exit status indicates that the support request has not been resolved, decrementing a weight value associated with the factor by a certain value.

23. The method of claim 19, further comprising:
receiving second input data pertaining to a second support request;
receiving one or more search terms pertaining to the second support request, wherein at least a portion of the search terms and/or the second input data include one or more of the factors;
generating a second query based on the second input data and the search terms;
querying the solution data store using the second query; and
identifying a list of possible solutions for the second support request in a sequence, wherein the sequence comprises one or more of the possible solutions to the second support request, wherein a position of each of the possible solutions to the second support request in the sequence is based on the weight value for each factor.

24. A distributed computing system for managing solutions for print device support requests, the distributed computing system comprising:
a print device having a user interface;
a solution data store comprising one or more non-transitory computer-readable media sectors that store content representing a plurality of solutions to a plurality of print device issues;
a solution processing system in communication with the print device, wherein the solution processing system comprises a processor and programming instructions that are configured to cause the processor to:
receive a support request from the print device, wherein the support request comprises print device data pertaining to an issue with the print device,
use the print device data to generate a search query,
query the solution data store using the search query to identify a list of possible solutions for the support request, wherein each possible solution is associated with a plurality of factors, wherein each factor has a weight value,
return to the print device the list of possible solutions for display to a user of the print device via the user interface,
receive a selection of one or more of the possible solutions,
for each selection:
receive, from the print device, an indication of an exit status for the support request, wherein the exit status represents a resolution to the support request,
generate a session record for the support request comprising the print device data, the possible solution associated with the selection and the exit status,
correlate the possible solution associated with the selection with the print device data,
generate one or more factors based on the correlation, and
use the one or more generated factors to update one or more fields of a solution index in the data store for the possible solution by, for one or more of the one or more factors:
determining whether the factor is already present in the index, and
in response to determining that the factor is already present in the solution index:
determining whether the exit status indicates that the support request has been resolved,
in response to determining that the exit status indicates that the support request has been resolved, increment a weight value associated with the factor by a certain value, and
in response to determining that the exit status indicates that the support request has not been resolved, decrement a weight value associated with the factor by a certain value.

25. A distributed computing system for managing solutions for print device support requests, the distributed computing system comprising:
a print device;
a solution data store comprising one or more non-transitory computer-readable media sectors that store content representing a plurality of solutions to a plurality of print device issues;
a solution processing system in communication with the print device, wherein the solution processing system comprises a processor and programming instructions that are configured to cause the processor to:
receive a support request from the print device, wherein the support request comprises print device data pertaining to an issue with the print device,
use the print device data to generate a search query,
query the solution data store using the search query to identify a possible solution for the support request, wherein the possible solution is associated with a plurality of factors, wherein each factor has a weight value, wherein the possible solution comprises one or more machine-readable instructions for implementing the solution,
return to the print device the possible solution for automatic implementation,
receive a selection of one or more of the possible solutions,
for each selection:
receive, from the print device, an indication of an exit status for the support request, wherein the exit status represents a resolution to the support request,
generate a session record for the support request comprising the print device data, the possible solution associated with the selection and the exit status,
correlate the possible solution associated with the selection with the print device data,
generate one or more factors based on the correlation, and
use the one or more generated factors to update one or more fields of a solution index in the data store for the possible solution by, for one or more of the one or more factors:
determining whether the factor is already present in the index,
in response to determining that the factor is already present in the solution index:
determining whether the exit status indicates that the support request has been resolved,
in response to determining that the exit status indicates that the support request has been resolved, increment a weight value associated with the factor by a certain value, and
in response to determining that the exit status indicates that the support request has not been resolved, decrement a weight value associated with the factor by a certain value.

26. A method for managing solutions for print device support requests, the method comprising:
receiving, by a solution processing system, a support request from a print device, wherein the support request comprises print device data pertaining to an issue with the print device;
using the print device data to generate a search query;
querying a solution data store using the search query to identify a list of possible solutions for the support request, wherein the solution data store comprises one or more non-transitory computer-readable media sectors that store content representing a plurality of solutions to a plurality of print device issues, wherein each possible solution is associated with a plurality of factors, wherein each factor has a weight value;
returning to the print device the list of possible solutions for display to a user of the print device via a user interface of the print device;
receiving a selection of one or more of the possible solutions;
for each selection:
  receiving, from the print device, an indication of an exit status for the support request, wherein the exit status represents a resolution to the support request,
  generating a session record for the support request comprising the print device data, the possible solution associated with the selection and the exit status,
  correlating the possible solution associated with the selection with the print device data,
  generating one or more factors based on the correlation, and
  using the one or more generated factors to update one or more fields of a solution index in the data store for the possible solution by, for one or more of the one or more factors:
    determining whether the factor is already present in the index, and
    in response to determining that the factor is already present in the solution index:
      determining whether the exit status indicates that the support request has been resolved,
      in response to determining that the exit status indicates that the support request has been resolved, incrementing a weight value associated with the factor by a certain value, and
      in response to determining that the exit status indicates that the support request has not been resolved, decrementing a weight value associated with the factor by a certain value.

27. A method for managing solutions for print device support requests, the method comprising:
  receiving, by a solution processing system, a support request from a print device, wherein the support request comprises print device data pertaining to an issue with the print device;
  using the print device data to generate a search query;
  querying a solution data store using the search query to identify a possible solution for the support request, wherein the solution data store comprises one or more non-transitory computer-readable media sectors that store content representing a plurality of solutions to a plurality of print device issues wherein the possible solution is associated with a plurality of factors, wherein each factor has a weight value, wherein the possible solution comprises one or more machine-readable instructions for implementing the solution,
  returning to the print device the possible solution for automatic implementation;
  receiving a selection of one or more of the possible solutions;
  for each selection:
    receiving, from the print device, an indication of an exit status for the support request, wherein the exit status represents a resolution to the support request,
    generating a session record for the support request comprising the print device data, the possible solution associated with the selection and the exit status,
    correlating the possible solution associated with the selection with the print device data,
    generating one or more factors based on the correlation, and
  using the one or more generated factors to update one or more fields of a solution index in the data store for the possible solution by:
    determining whether the factor is already present in the index, and
    in response to determining that the factor is already present in the solution index:
      determining whether the exit status indicates that the support request has been resolved,
      in response to determining that the exit status indicates that the support request has been resolved, incrementing a weight value associated with the factor by a certain value, and
      in response to determining that the exit status indicates that the support request has not been resolved, decrementing a weight value associated with the factor by a certain value.

* * * * *